Nov. 12, 1940.          J. S. BAKER          2,221,041
CONTROL FOR HEATING SYSTEMS
Filed July 23, 1934
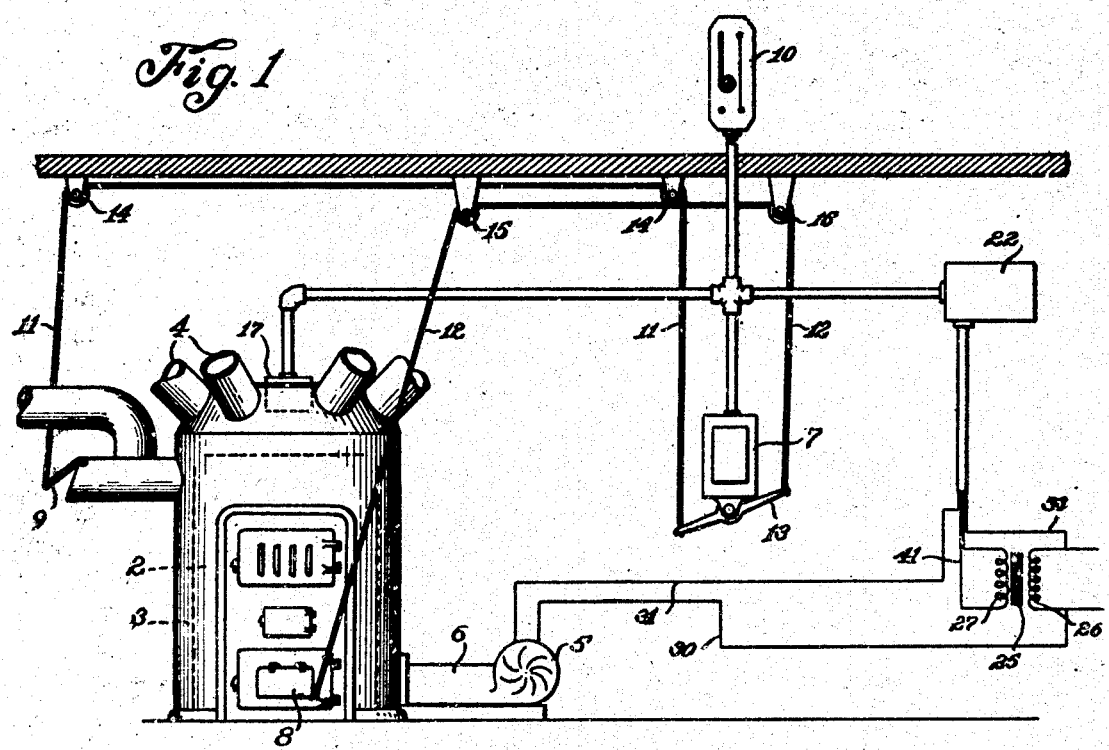
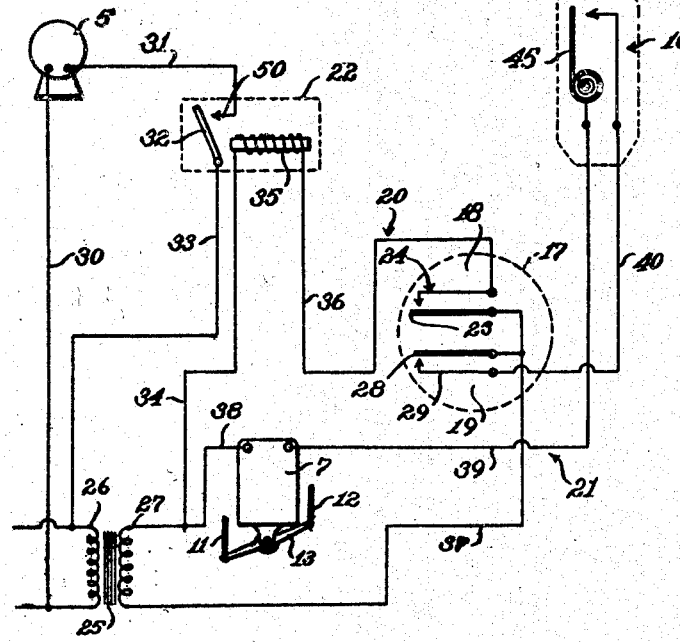
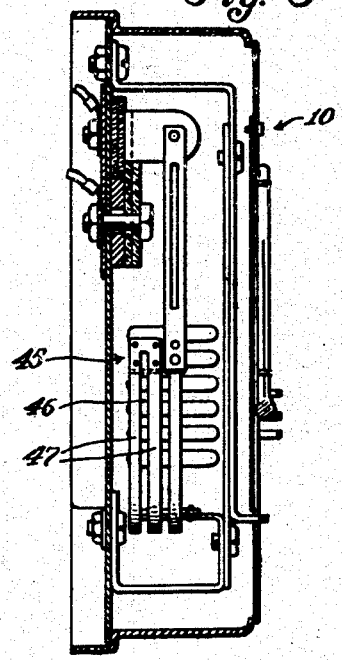
Inventor;
John S. Baker,
By Jones, Addington, Ames & Seibold,
Attys.

Patented Nov. 12, 1940

2,221,041

UNITED STATES PATENT OFFICE 2,221,041

CONTROL FOR HEATING SYSTEMS

John S. Baker, Chicago, Ill., assignor to Cook Electric Company, Chicago, Ill., a corporation of Illinois Application July 23, 1934, Serial No. 736,495

2 Claims. (Cl. 236—9)

My invention relates to heating systems, and more particularly to control apparatus for use with hot air furnaces or other suitable types of heaters.

Usually, in heating systems for homes or the like employing hot air furnaces, apparatus is provided to control the rate of combustion and the rate of supply of a heat conducting medium. In the case of oil or gas fired furnaces, the apparatus is arranged to connect with a valve controlling the flow of oil or gas, and, in certain instances, also with the air supply supporting combustion, while, in the case of coal-fired furnaces, a damper controller is employed to actuate the draft and check dampers of the furnace. In either case, the heat conducting medium is supplied by suitable means, usually controlled by furnace and room temperatures, whereby the heat conducting medium will not be circulated through the system unless the temperature of the furnace is above a predetermined degree and the room thermostat is calling for heat. With the control apparatus remaining under the control of the room thermostat, the supply of the heat conducting medium to the room continues until the room temperature is satisfied. The room thermostat will then suddenly operate to check the fire and the supply of hot air at a time when the fire is at a high rate of accelerated combustion, thereby allowing a great portion of the heat to escape through the flue of the furnace.

It is quite obvious that any attempt to continue circulating the hot air after the sudden operation of the room thermostat at the temperature satisfying its ultimate demand will result in a serious overheating of the room. On the other hand, it is generally recognized that an undesirable condition exists in the warm air heating systems after the room thermostat is satisfied and operates to stop the blower in that there is a tendency of the air in the room to stratify and create a cold condition. Although numerous attempts have been made to rectify it, no satisfactory solution has been obtained.

An object of the invention is to provide, therefore, control apparatus for heating systems in which the rate of supply of the heat conducting medium is preferably under the control of the furnace and independent of the control of the room thermostat so that the heat conducting medium may continue to circulate to the room after the room thermostat is satisfied, thereby overcoming stratification of the air and preventing undue waste of heat through the flue of the furnace.

A further object of the invention is to provide a thermostat of the type anticipating the action of the fire in satisfying room temperature by operating to discontinue the combustion controlling means in advance of the normal predetermined room temperature, whereby more frequent operation of the blower results and the fire gradually brought to the point of combustion supplying sufficient heat without unduly wasting the same through the furnace flues.

A further object of the invention is to provide a control of this type wherein the blower or other means used to circulate the heat conducting medium is operated more frequently, as well as the combustion controlling means, so that combustion may be accelerated, but at frequent intervals, and the blower likewise operated to remove the heated air and circulate it to the room, the room temperature thereby being gradually built up without too great an accelerated combustion tending to overheat the room.

Accordingly, greater heating efficiency may be obtained without an over-fired condition, because the combustion is not accelerated too greatly before being checked by the room thermostat each time it operates. The heat is more efficiently removed at frequent intervals so that a quickly built-up room temperature may be obtained without over-firing and an over-run of the furnace at any time in the operation of the system. A more uniform fire or combustion may be obtained at the furnace and a more uniform production of heat obtained so that more heat may be removed from the furnace by the more frequent operations of the blower to prevent an excessive waste by heat unnecessarily escaping out the flue.

Other objects and advantages of the invention will be apparent from the following detailed description when taken in connection with the accompanying drawing.

In the drawing,

Figure 1 is a diagrammatic representation of a warm air heating system embodying my invention;

Fig. 2 is a wiring diagram of the control circuit; and,

Fig. 3 is a vertical sectional view of an anticipating type of room thermostat that may be used.

Referring to the drawing, the apparatus shown is merely illustrative of a heating system capable of embodying the invention. Heater or furnace 1 is usually located in the cellar of the house and delivers hot air, hot water, steam, vapor or other suitable heating medium to a heat radiating or equivalent structure located at suitable points, say in the rooms of the various floors of a dwelling or building. Furnace 1 may use coal or other solid fuel, or there may be used fluid fuel, as oil or gas.

Furnace 1 includes a fire-box 2, warm air duct 3, forming a bonnet for the furnace, and one or more warm air ducts 4 leading to the room or rooms to be heated. A blower 5 is illustrated as communicating with warm air duct 3 by a conduit 6.

Damper controller or other equivalent means 7 may be provided to control the movement or positions of the draft and check dampers 8 and 9, respectively, of the furnace, the air supplied by the draft damper 8 in open position passing upwardly through the grate and the fuel to supply the oxygen which supports the combustion. The rate of combustion will depend upon the air supplied by the open draft damper 8, but it will be understood that other means furnishing say a forced draft may be employed, or that, in the case of liquid fuel or gas, the rate of combustion may be controlled by controlling the amount of fuel, or draft thereto, or both, in an automatically controlled system including a room thermostat 10 or its equivalent.

Electrically operated controller 7 may be of any conventional type, and consequently, it is not believed necessary to describe in detail its construction. It is only essential that controller 7 be capable of operating dampers 8 and 9 whereby to open draft damper 8 and close check damper 9 when it is desired to provide a forced draft to the fire box to increase the combustion and to reverse the position of these dampers when the heat of the furnace, or the temperature of the room, rises above a predetermined temperature to check the combustion.

Any suitable arrangement of the apparatus may be adopted which, in the case of the showing in Fig. 1, includes flexible connections 11 and 12 between the draft and check dampers 8 and 9 and the damper arm 13 of the damper controller 7. Suitable pulleys 14 and 15 may be employed to guide the flexible connections 11 and 12, so that movement of damper lever 13 will operate alternately to open and close the draft and check dampers 8 and 9.

Bonnet 3 of furnace 1 may be provided with a suitable switch box 17 containing furnace switches 18 and 19. Each of the switches 18 and 19 is provided with a control circuit 20 and 21, respectively. A relay 22 is provided in control circuit 20 to effect closing of the circuit of the motor driven blower 5 when the temperature of the furnace exceeds a predetermined degree. When this temperature is reached, contact 23 will engage contact 24 of switch 18. On the other hand, room thermostat 10 is in control circuit 21, having furnace switch 19 therein. Switch 19 opens control circuit 21 when the temperature of the furnace exceeds a predetermined degree.

Any suitable source of current supply may be used. A transformer 25 having a primary coil 26 and a secondary coil 27 is shown, the arrangement being to allow the circuit of the motor driven blower 5 to connect to the primary side of transformer 25, if desired. The secondary coil 27 may be used to supply current to control circuits 20 and 21.

Specifically, the circuit of the motor driven blower 5 includes wire 30, motor driven blower 5, wire 31, contact 50, armature 32 of relay 22, and wire 33 connecting to the return side of the power mains. Control circuit 20 includes wire 34, coil 35 of relay 22, wire 36, contacts 24 and 23 of switch 18 and the return wire 37. Control circuit 21 includes the secondary coil 27 of transformer 25, wire 38, the damper controller 7, wire 39, thermostat 10, wire 40 to contacts 29 and 28 of furnace switch 19, and by return wire 37 to the secondary coil 27 of transformer 25.

As previously stated, the room thermostat 10 may be of any suitable type, but preferably of an anticipating type, such as is disclosed and claimed in copending application Serial No. 704,654. In this thermostat, the bimetallic element 45 is adapted in its operation to be influenced by the temperature of the ambient air or other surrounding medium. The differential of this element is represented by the temperature change of the ambient air which influences its operating movement to open position after it has been closed. Usually, a minimum differential is desirable for thermostats employed in a heating system for dwellings or buildings, it being customary to arrange the bimetallic element to close, say, for example, at 68° Fahr., and to open at 70° Fahr. Usually, the length of time required for the fire to raise the temperature of the heat conducting medium results in such an acceleration of combustion at furnace 1 that the fire will continue raising the temperature of the heat conducting medium after the room temperature has satisfied the thermostat, say at 70° Fahr. and the room temperature will continue to rise and go considerably beyond this thermostatic setting. If the current density of the thermostatic element or strip 45 is increased, the electrical resistance to the flow of current will produce a warming action of the bimetallic element 45 automatically to alter this predetermined setting, whereby the thermostatic element will be influenced to operate to open position below that at which its predetermined setting is arranged to effect such action.

It is found that a negative differential may even be obtained by the arrangement disclosed so that the bimetallic element 45 may open at a temperature below the temperature at which it is influenced by the ambient temperature to effect a closing movement. To illustrate: The bimetallic element 45 provided with an increased current density, as disclosed herein, may open with the warming action thereof developed by the current therein, when the room has an actual temperature, say, for example, of 67.5° Fahr. Such current density may be provided by reducing the cross section of the bimetallic element 45 and yet obtain the necessary rigidity thereof, by providing it of a length increasing the actual path of the current flow. This result is obtained by slotting at 46 that portion of the bimetallic element which is coiled. Slots 46 are so placed that the cross section between the slots is of the necessary area and the number of resulting sections is sufficient to give the required mechanical rigidity. The warming action produced by the current being conducted back and forth through sections 47 may be increased or diminished with considerable nicety by varying their cross section.

Further description and operation of the thermostat is believed unnecessary, because any type of anticipating thermostat might be employed to accomplish the objects of the present invention.

The operation of the heating system disclosed will now be described: Assume that the room temperature has dropped below the normal predetermined setting of thermostat 10. If furnace thermostat 19 is closed, the bimetallic element 45 will operate to close control circuit 21. Current will then flow from secondary coil 27, through wire 38, electrically operated damper controller 7, wire 39, room thermostat 10, wire 40, furnace thermostatic switch 19, and returned by wire 37. The electrically operated damper controller 7 now being energized will move damper lever 13 clockwise to open draft damper 8 and to close check damper 9. The rate of combustion will thereby be accelerated to raise the temperature of furnace 1. When the temperature of the furnace exceeds a predetermined degree, the contact 24 will engage contact 23 of the furnace thermostatic switch 18 of the second control circuit 20. The current will now flow through this second control circuit 20 from secondary coil 27 through wire 34, coil 35 of relay 22, wire 36, the furnace switch 18, and returned by common return wire 37 to secondary coil 27. Energizing coil 35 of relay 22 actuates its armature 32 to engage a contact 50 in the circuit of the motor driven blower 5. Current will flow through this circuit of motor driven blower 5 from one side of the power line comprising wire 30, the motor of the blower 5, wire 31, contact 50, armature 32, and returned to the other side of the power line by wire 33.

It is observed that the control apparatus supplying the heat conducting medium, which, in this instance, is the motor driven blower 5 furnishing heated air from bonnet 3 of the warm air furnace 1, will continue to operate as long as the temperature of the furnace is above a predetermined degree.

However, room thermostat 10 being of the anticipating type, will open control circuit 21 before the normal room temperature is obtained, as the result of the current flowing through the slotted coil 47 of increased current density. As previously explained, such current flow through this slotted coil 57 of increased current density produces a warming action affecting the bi-metallic strip 45 so that a negative differential might be obtained, if so desired, to result in the bimetallic strip 45 opening the control circuit 21 at an actual room temperature, say, for example, only of 67.5° Fahr. However, the hot air continues to circulate from the furnace to the room, but the damper controller 7 will be deenergized to check the combustion at the furnace. Accordingly, the combustion is not permitted to accelerate to a point where the fire will continue raising the temperature of the pot and the heat conducting medium. The normal room temperature has not been obtained at this point of operation, so that there will be no overrunning of the furnace to produce an uncomfortable room temperature as the result of the accelerated combustion thus far obtained. If continuous operation of the motor driven blower 5 delivering the hot air to the room will not satisfy the normal setting of room thermostat 10, the bimetallic element 45 will again close to energize control circuit 21. The electrically operated damper controller 7 will again operate to open the draft damper 8 and to close the check damper 9. Accelerated combustion will again occur to raise the temperature of the furnace and increase the temperature of the heated air being circulated from the furnace to the room. Again, the current flowing through the slotted coil 47 of bimetallic element 45 will produce a warming action to open this bimetallic element 45 in advance of the normal setting of room thermostat 10. Again the fire will be checked, but the blower 5 will continue to deliver heated air to the room. This operation will occur as many times as may be necessary finally to bring the room temperature to the predetermined normal setting, say, for example, only of 70° Fahr. If the temperature of the furnace should exceed a predetermined degree, such as may cause overheating of the furnace, furnace thermostatic switch 19 will open to deenergize controlling circuit 21 and cause the electrically operated damper controller 7 to check the combustion at the furnace 1. The blower 5 will continue to operate, however, which has the effect of rapidly cooling the furnace.

If at any time the furnace temperature should drop below a predetermined degree to cause the air circulated by blower 5 to be delivered to the room at too low a temperature to produce comfort, furnace thermostatic switch 18 will open to de-energize control circuit 20. De-energizing control circuit 20 will not affect the energization of control circuit 21. Consequently, the electrically operated damper controller 7 may continue to hold draft damper 8 opened and check damper 9 closed to increase combustion until the furnace temperature has been raised to a point which is sufficient to heat the air furnished by blower 5 before it is delivered to the room.

One of the advantages of the heating system herein disclosed is that in the event of failure of the room thermostat 10, or in fact any part of the apparatus, to function normally and open the control circuit 21 when the room temperature has been raised to meet the demands of the thermostat 10, heated air from the furnace will continue to be circulated to the room. The abnormally increased temperature will therefore produce a sensible feeling to the occupants of the room which will act as a warning that the heating system has failed and the furnace 1 is being overheated.

Moreover, the system herein disclosed will result in more efficient operation of the motor driven blower so as to provide an almost continued movement of the heated air in the room. I have found that this arrangement is the closest approach to overcoming air stratification in the room which results in producing what is known in the industry as a "cold 70". On the other hand, the present heating system is more efficient than systems heretofore produced because the supply of heated air to the room is allowed to continue after the room thermostat has been opened. This has been generally contrary to accepted heating practice, but is unusually efficient when a room thermostat of the anticipating type is employed. The room temperature is gradually brought to the normal predetermined setting, and consequently, the almost continuous operation of the blower will not deliver excessive heat to the room. Accelerated combustion at a slower rate is obtained, but more heat is taken from the furnace and delivered to the room than if the room thermostat remains closed until the normal predetermined room temperature would be reached.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A heating system including a furnace comprising, in combination, means for increasing the rate of combustion, means for circulating a heat conducting medium heated by said combustion increasing means, room thermostatic apparatus for controlling said combustion increasing means, furnace thermostatic apparatus for controlling said medium circulating means, connections between combustion increasing means and said room thermostatic apparatus whereby heat is supplied to said medium upon a predetermined drop of room temperature, and connections between said medium circulating means and said furnace thermosatic apparatus whereby said medium is continuously circulated to the room when the furnace is above a predetermined low temperature to provide a constant circulation of heated air in the room during on and off operations of said room thermostatic apparatus.

2. A heating system comprising, in combination, means for controlling the rate of combustion, means for controlling the rate of supply of a heat conducting medium, a control circuit for each means, thermostatic apparatus in one of said control circuits responsive to furnace and room temperatures, and thermostatic apparatus in the other control circuit responsive to furnace temperature, said thermostatic apparatus operating to supply said medium continuously above a predetermined low furnace temperature to provide a constant circulation of heated air in the room and to effect a supply of heat to said medium below a predetermined high furnace temperature whenever said constantly circulated air in the room fails to maintain a room temperature above a predetermined value.

JOHN S. BAKER.